Aug. 15, 1950  F. L. POWERS  2,518,816
TOW BAR
Filed Jan. 2, 1946
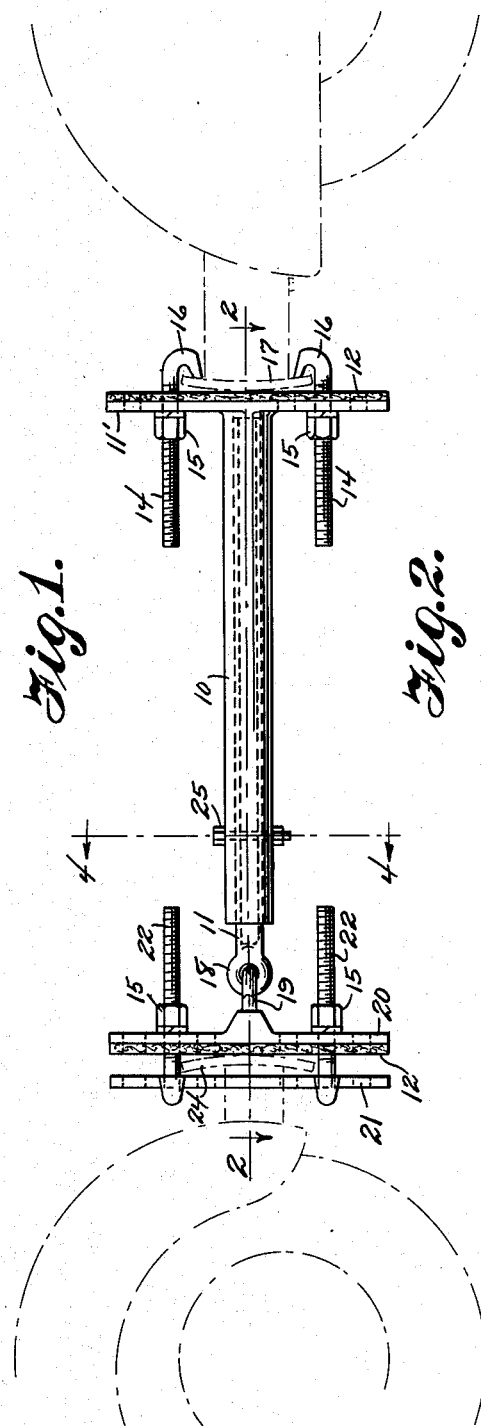
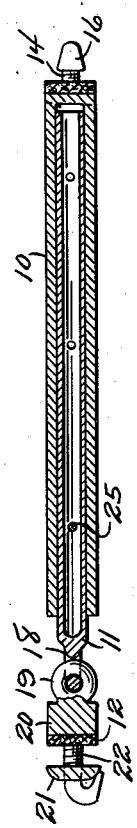
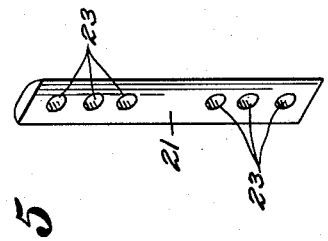
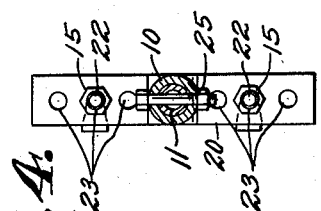
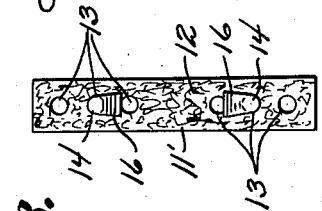
INVENTOR.
Frank L. Powers
BY Victor J. Evans & Co.
ATTORNEYS Patented Aug. 15, 1950

2,518,816

UNITED STATES PATENT OFFICE 2,518,816

TOW BAR

Frank L. Powers, Endicott, N. Y.

Application January 2, 1946, Serial No. 638,676

2 Claims. (Cl. 280—33.14)

The invention relates to a tow bar, and more especially to a hitch device for coupling motor or other vehicles together.

The primary object of the invention is the provision of a device of this character, wherein the engagement of bumpers adjacent to each other of separate vehicles can be had thereby, for the coupling of these vehicles together so that one vehicle can be towed by the other under the service of a single driver of one vehicle, the device being such as to eliminate damage to the bumpers of either vehicle while in use.

Another object of the invention is the provision of a device of this character, wherein the coupling of the vehicles can be accomplished with ease and dispatch, and also the said device can be detached without excessive labor and single handed.

A further object of the invention is the provision of a device of this character, wherein it is adjustable to vary the distance between vehicles when coupled to each other, and additionally can be folded into compact form so that it can be conveniently stored and carried in the least possible space within a vehicle, the device being adaptable for varying styled or shape bumpers equipped on vehicles.

A further object of the invention is the provision of a device of this character, which is simple in construction, thoroughly reliable and efficient in operation, strong, durable, possessed of few parts, readily and easily adjusted, applied and removed and inexpensive to manufacture and install.

With these and other objects in view the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is a side view of the device constructed in accordance with the invention in an applied position.

Figure 2 is a sectional view taken on the line 2—2 of Figure 1 looking in the direction of the arrows.

Figure 3 is an outer face view of one end clamps of the device.

Figure 4 is a sectional view taken on the line 4—4 of Figure 1 looking in the direction of the arrows.

Figure 5 is a perspective view of the gripper piece of the other clamp of the device.

Similar reference characters indicate corresponding parts throughout the several views in the drawing.

Referring to the drawing in detail, the tow bar constituting the present invention, comprises an extensible draft element involving telescopically interfitted tubiform elongated members 10 and 11, respectively, one being slidable within the other. At the outer end of the lead member 10 is formed a cross head 11' of flat plate-like contour, as best seen in Figure 3 of the drawing, and the outside surface of this head carries a felt pad 12, the former with the latter being provided with registering spaced series of spaced holes 13 for selectively accommodating a cooperating pair of hook-jaw terminal bolts 14 each having threaded on its shank a binding nut 15, while the jaw 16 is designed to engage and hook to a bumper 17 of a draft vehicle, the latter and the said bumper being partially indicated by dotted lines in Figure 1 of the drawing. One hook bolt 14 engages the top edge area of the bumper, while the other hook bolt 14 of the pair engages the bottom edge area of such bumper, and the latter is clamped thereby fast to the felt padded side of the head 11', as best seen in Figure 1 of the drawing.

The member 11 at its outer end is formed with an eye 18 which has linkage with an eye 19 integrally formed centrally of the length of another cross head 20, which is identical to the head 11' and has associated therewith a clamping piece 21 similarly shaped thereto. This piece 21 is coupled adjustably to the head 20 by a pair of hook-jaw terminal bolts 22 which are accommodated in the series of spaced registering holes 23 in said head 20 and piece 21, respectively. This piece 21 clamps between it and the said head 20 the bumper 24, of the towed vehicle, the latter and the bumper being partially shown by dotted lines in Figure 1 of the drawing. The bolts 22 are duplicates of the bolts 14, as will be apparent from Figure 1 of the drawing. The piece 21 is interchangeable from one head to the other, and this piece may be dispensed with entirely for the fitting of the device to vehicles for towing purposes, as should be obvious.

The members 10 and 11 are adjustably secured together by a cross key or fastener 25.

In operation, it will be apparent that when it is desired to tow one vehicle by another, the cross head 11 is placed against the bumper of the towing vehicle whereupon the terminal bolts 14 are inserted through suitable openings 13, the jaws 16 engaging the inner side of such bumper.

Thereafter the binding nuts 15 are screwed into place. The cross head 20 is placed against the bumper of the vehicle to be towed and the clamping piece 21 is placed therebehind. The bolts 22 are then placed in suitable openings 23 in the cross head and in registering holes in the clamping piece and the nuts 15 tightened. The cross key 25 allows for longitudinal adjustment between the members 10 and 11.

What is claimed is:

1. In a tow bar, a pair of adjustable telescoping elongated members, a cross head secured to the outer end of one of said members, a felt pad carried by said cross head, there being a plurality of spaced registering holes arranged in said cross head and pad, a plurality of terminal bolts projecting through the registering holes, there being a jaw arranged on each of said bolts for engagement with a vehicle bumper, an eye secured to the outer end of said other member, a cross head pivotally connected to said eye, a felt pad secured to last named cross head, and a plurality of terminal bolts carried by said last named cross head.

2. In a tow bar, a pair of adjustable telescoping elongated members, a cross head secured to the outer end of one of said members, a felt pad carried by said cross head, there being a plurality of spaced registering holes arranged in said cross head and pad, a plurality of terminal bolts projecting through the registering holes, there being a jaw arranged on each of said bolts for engagement with a vehicle bumper, an eye secured to the outer end of said other member, a cross head pivotally connected to said eye, a felt pad secured to last named cross head, a plurality of terminal bolts carried by said last named cross head, and means for maintaining said elongated members immobile in their adjusted position.

FRANK L. POWERS.

REFERENCES CITED

The following references are of record in the file of this patent:

UNITED STATES PATENTS

| Number | Name | Date |
|---|---|---|
| 1,535,397 | Buffington | Apr. 28, 1925 |
| 1,537,249 | Manley | May 12, 1925 |
| 1,836,806 | Larsen | Dec. 15, 1931 |
| 2,179,439 | Trow | Nov. 7, 1939 |
| 2,319,521 | Schneider | May 18, 1943 |